(12) United States Patent
Nijim et al.

(10) Patent No.: US 7,738,036 B2
(45) Date of Patent: Jun. 15, 2010

(54) SYSTEM AND METHOD FOR SMOOTHING SEAMS IN TILED DISPLAYS

(75) Inventors: Yousef Wasef Nijim, Valencia, CA (US); Charles Bryan Hunt, Westfield, IN (US); Mark Alan Schultz, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 782 days.

(21) Appl. No.: 10/580,811

(22) PCT Filed: Dec. 30, 2004

(86) PCT No.: PCT/US2004/044050

§ 371 (c)(1),
(2), (4) Date: May 25, 2006

(87) PCT Pub. No.: WO2005/067288

PCT Pub. Date: Jul. 21, 2005

(65) Prior Publication Data

US 2007/0103652 A1      May 10, 2007

Related U.S. Application Data

(60) Provisional application No. 60/533,136, filed on Dec. 30, 2003, provisional application No. 60/533,138, filed on Dec. 30, 2003, provisional application No. 60/533,121, filed on Dec. 30, 2003.

(51) Int. Cl.
*H04N 9/31* (2006.01)
*H04N 5/57* (2006.01)

(52) U.S. Cl. .......................... 348/383; 348/745; 345/1.3

(58) Field of Classification Search ................. 348/383, 348/778, 739, 735, 805, 806, 807, 763, 687, 348/744; 345/1.3
See application file for complete search history.

(56) References Cited

U.S. PATENT DOCUMENTS 4,827,334 A * 5/1989 Johnson et al. ............. 348/752

(Continued)

FOREIGN PATENT DOCUMENTS

EP          1039749        9/2000

(Continued)

OTHER PUBLICATIONS

Theo Meyer; "Design considerations and applications for innovative display options using projector arrays" Proceedings of SPIE, vol. 2650, 1996, pp. 131-139 XP002326068.

(Continued)

*Primary Examiner*—M. Lee
(74) *Attorney, Agent, or Firm*—Robert D. Shedd; Harvey D. Fried; Richard LaPeruta, Jr.

(57) ABSTRACT

The present invention provides method for producing a substantially seamless video image on a display surface. The method comprises the steps of separately projecting at least a first and a second video image onto a display surface such that a seam is defined by overlapping portions of said first and second video images. Inside the seam, the brightness of the first video image and the brightness of the second video image are adjusted electronically so as to provide a uniform brightness profile.

6 Claims, 3 Drawing Sheets

U.S. PATENT DOCUMENTS

| | | | |
|---|---|---|---|
| 5,136,390 A * | 8/1992 | Inova et al. ................ | 348/383 |
| 6,545,685 B1 * | 4/2003 | Dorbie ...................... | 345/582 |
| 6,558,006 B2 * | 5/2003 | Ioka .......................... | 353/94 |
| 2002/0057361 A1 | 5/2002 | Mayer, III et al. | |
| 2003/0103162 A1 | 6/2003 | Sano et al. | |

FOREIGN PATENT DOCUMENTS

| | | |
|---|---|---|
| EP | 1187471 | 3/2002 |
| EP | 1271944 | 1/2003 |
| WO | WO02/19704 | 3/2002 |

OTHER PUBLICATIONS

Search Report Apr. 26, 2005.

* cited by examiner

SYSTEM AND METHOD FOR SMOOTHING SEAMS IN TILED DISPLAYS

FIELD OF THE INVENTION

This application claims the benefit, under 35 U.S.C. §365 of International Application PCT/US04/44050 filed Dec. 30, 2004, which was published in accordance with PCT Article 21(2) on Jul. 21, 2005 in English and which claims the benefit of United States provisional patent application No. 60/533,136, 60/533,138, 60/533,121 filed Dec. 30, 2003.

BACKGROUND OF THE INVENTION

Multiple projector systems have been proposed and used for many years. In the 1950s, the "CINERAMA" system was developed for the film industry. The CINERAMA system used three films to project three images using three separate projectors, which were then combined to form a single panoramic image.

A difficulty with multiple projector display systems is that the multiple images often do not appear as one single continuous image on the display screen. When two images are projected side by-side on a single screen, there is normally a seam between the images. The final display image will either appear as two images placed side-by-side with a gap therebetween or, if the images are made to overlap on a single screen, with a bright line there-between. Because of the inconsistencies in conventional cameras, video processing and delivery channels, displays and specifically projectors, it is exceedingly difficult to perfectly match the resultant video images so that no tiling artifact appears among the images. If the images are brought very close together on the same screen, there are typically overlaps at each seam regions.

Therefore, systems and methods for providing generally seamless images in multiple projector display systems are needed. Furthermore, projector lens inherently distort images to some extent especially at the edges of the lenses. It is desirable that distortion in the displayed images be minimized, especially at the edges of the lenses, since this area of the lens is more likely to project images displayed closest to seams.

Conventional electronic distortion correction involves capturing, with a video image capture device, an image as it is displayed and generating feedback signals representative of the displayed distortion. Feedback signals are used to cancel out the distortion. Such a solution provides some improvement to the problem of lens distortion. However, among other drawbacks, this type of electronic distortion correction itself can add distortion, often adds to system complexity and cost, and complicates calibration and user interfaces.

Therefore, systems and methods are needed for tiled display systems which do not include visually disturbing seams between the tiles. Further, there is a need for a tiled display system which merges together projected images from multiple tiles to form a tiled image, but which does not require high-quality (and expensive) optics. Therefore, a system that can electronically compensate for lens distortion is needed. Further systems that can adjust for lens distortion without relying solely on external capture of the displayed image are desirable. Further systems and methods are needed that, provide a broader viewing angle than existing systems, while, at the sametime, more effectively concealing seams in tiled images.

SUMMARY OF THE INVENTION

The present invention provides method for producing a substantially seamless video image on a display surface. The method comprises the steps of separately projecting at least a first and a second video image onto a display surface such that a seam is defined by overlapping portions of said first and second video images. Inside the seam, the brightness of the first video image and the brightness of the second video image are adjusted electronically so as to provide a uniform brightness profile.

BRIEF DESCRIPTION OF THE DRAWINGS

Preferred embodiments of the present invention will be described below in more detail, with reference to the accompanying drawings, in which.

DETAILED DESCRIPTION

The quality of a projected image is a function of several characteristics, all of which can suffer distortion in the process of translation from video data to displayed image. For example, brightness distortion, also referred to as luminance distortion has may possible sources. For example, due to the design of the optics within the light engines and/or the lamps themselves, most projectors do not project at a constant luminance level across the entire screen. This non-uniformity in luminance detracts from the displayed image. The luminance non-uniformity of a projector and its associated lens can become more pronounced under certain conditions. For example, when a "composite" image is created by multiple projectors whose individual images are tiled together, e.g., in a 4 by 5 pattern, to form the composite image, the non-uniformity in luminance is often much more apparent. Luminance non-uniformities can also be created (or existing non-uniformities made more pronounced) when the displayed image is viewed at an angle to the display screen or surface. That portion of the displayed image that is closer to the viewer will typically appear with a first brightness, while those portions located further away will appear to have a different brightness.

Figure 5:
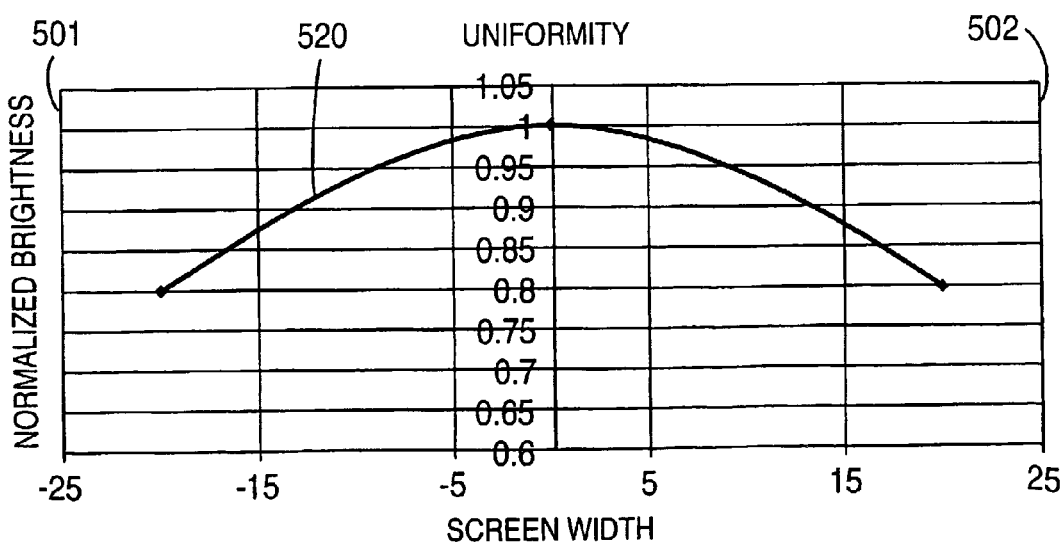
FIG. 5 illustrates a representative uniformity curve for a lens of a projector suitable for use in the present invention.

FIG. 5 illustrates an example of luminance uniformity of a light projected onto a screen 515 by a single projection lens (not shown). In this example, the graph defines a lens distortion profile for the lens projecting the light onto the screen. As can be seen from the graph, the projected light is brighter near the center 520 of the screen. This center area corresponds to the center of the projecting lens. The brightness of projected light drops off from the center of screen 515 toward the outer edges 501, 502 of the screen. These areas correspond to the outer regions of the projecting lens used to project the light onto the screen 515. Each projecting lens has a corresponding brightness uniformity profile. According to one embodiment of the invention for the lens comprising the system, each lens profile is measured, or otherwise characterized, and the resulting data stored in a memory accessible to the image processor (for example processor 170 of FIG. 1).

Figure 1:
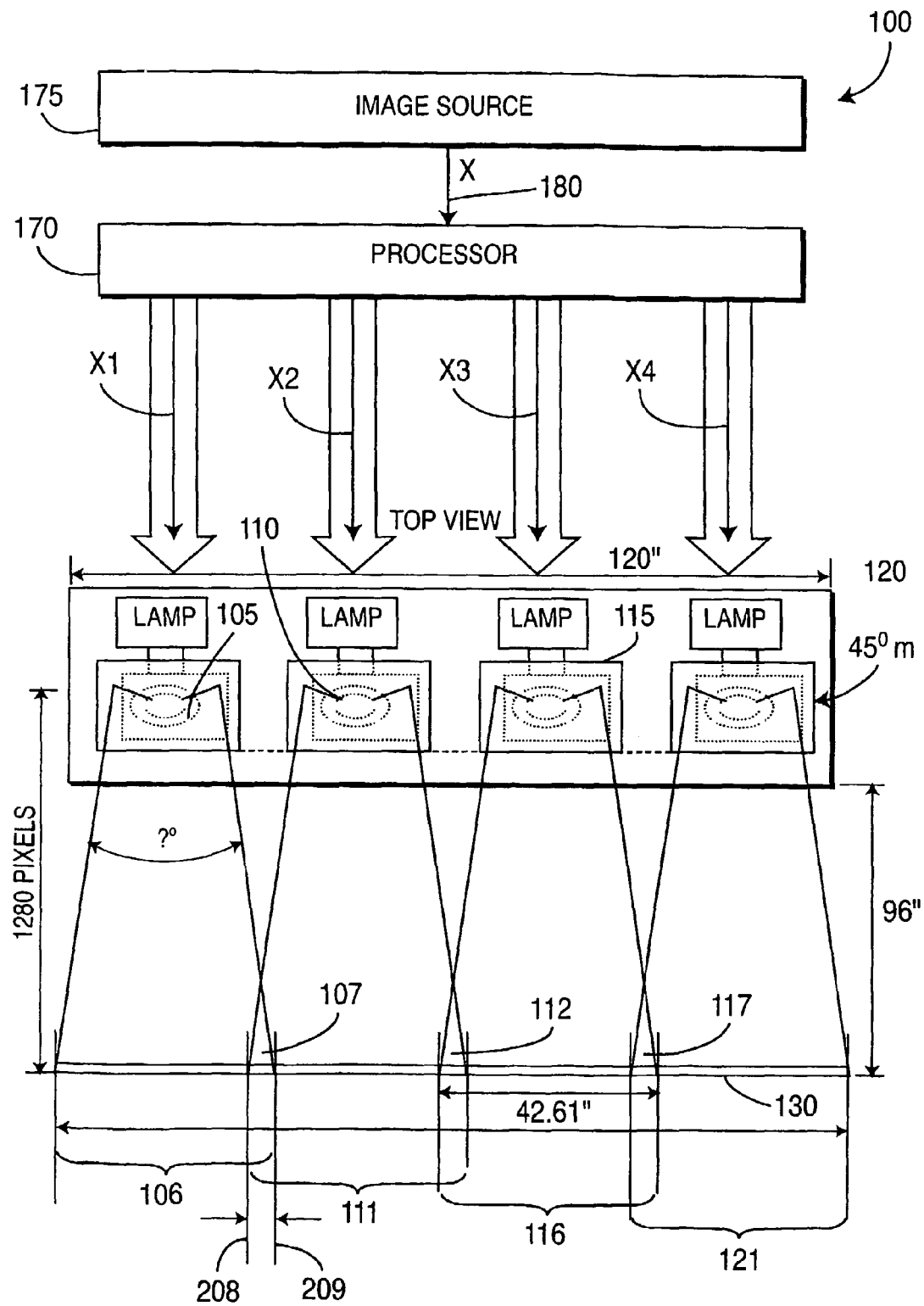
FIG. 1 is a top view of a display system comprising multiple projectors according to an embodiment of the invention.

FIG. 1 illustrates a plurality of example projectors 105, 110, 115 and 120 arranged according to an embodiment of the invention. An image source 175 provides a video image data representing a video, scene, or other visual image, either moving or still, to be displayed on display 130. The image data is typically is provided in a variety of conventional television and video formats depending on the particular capabilities of the associated display. In a system of the invention, video image data 180 is provided to a processor 170. Video image data 180 includes pixel brightness data for pixels x of the image. Processor 170 receives the video image data 180 including the pixel brightness data for pixels x. Processor 170, using tiling techniques, allocates the video image data 180 among the plurality of projectors 105, 110, 115 and 120 such that each projector is enabled to project a discrete image which, when projected onto display 130 and combined with the discrete images from the other projectors, will form a whole image to be displayed on display screen 130.

Therefore, each projector is provided with respective image data 181, 182, 183, 184 for projecting the corresponding discrete image onto display 130. FIG. 1 illustrates a simplified example. Video data 180 is provided to processor 170. Processor 170 allocates data 180 such that video data 181 is provided to projector 105, video data 182 is provided to projector 110, video data 183 is provided to projector 183 and video data 184 is provided to projector 120. Projector 105 projects an image 106 onto screen. 130 based on the video data 181. Likewise, projector 110 projects and image 111 onto screen 130, projector 115 projects an image 116 onto screen 130 and projector 120 projects and image 121 onto screen 130.

As can be seen from FIG. 1, images 106, 111, 116 and 121 overlap. Image 106 overlaps image 111 so as to define a seam region 107. Image 111 overlaps image 116 so as to define a seam region 112. Image 116 overlaps image 121 so as to define a seam region 117. The pixel brightness data corresponding to seam regions 107, 112, 117, is indicated in FIG. 1 as xi, x2, x3 and x4. Accordingly, a portion x1 of video data 181 corresponds to a portion of the video image 106 that lies within seam 107, that is, between seam edge 208 and seam edge 209 of seam 107. Likewise, a portion x2 of video data 182 corresponds to of the video image 111 that lies within seam 107, that is, between seam edge 208 and 209 of seam 107. The correspondence between video data, video image and seam applies to the remaining projectors and projected images. In order to simplify the discussion, only projectors 105 and 110 along with seam 107 will be described in detail herein. However, it will be understood that the same principles apply to the other projectors as well.

In the embodiment illustrated in FIG. 1 projectors 105, 110, 115 and 120 are of the spatial light modulator (SLM) type. One example of a commercially available SLM type projector known as a DLP™ projector. DLP™ is a trademark of Texas Instruments. In the example of FIG. 1 display surface 130 is spaced from a plane 131 of the projectors 105, 110, 115 and 120 by about 96".

Each of projectors 105, 110, 115 and 120 is configured so as to project a corresponding image 106, 111, 116 and 121 upon display surface 130. In the example illustrated in FIG. 1 display surface 130 measures about 120" in width. Each of projectors 105, 110, 115 and 120 is configured so as project their corresponding images so as to substantially fit substantially the entire original video image of display surface 130 when projected side by side. Accordingly, images 106, 111, 116 and 121 overlap thereby defining seams 107, 112, and 117. In this example each seam 107, 112, and 117 measures about 10" in width.

The light engine for each projector comprises any suitable technology, such as one or more Liquid Crystal Display (LCD) panels, Digital Light Processing (DLP) or Liquid Crystal on Silicon (LCOS). Nonetheless, those skilled in the art will recognize that the present invention may be used with other projectors, including those using other types of image generation technologies.

Each projector 205, 210, 215 and 220 includes optical elements to properly prepare the incoming illuminations to illuminate the SLM such as a DMD™ and project the outgoing image. The optical path of such devices typically comprises two segments including an illumination path and a projection path. The illumination path starts with a high-reliability, metal halide, short-arc lamp that illuminates the DMD™. The light from the arc lamp passes into a rotating RGB color filter wheel. An illumination relay lens magnifies the beam to illuminate the DMD™ and form a to telecentric image at the DMD™. A Total Internal Reflection (TIR) prism enables the incoming light from the lamp to pass onto the DMD™, and back into the projection optics. Depending on the rotational state of the mirror (e.g.±10 degrees for on/off), the light from the DMD™ is directed into the pupil of the projection lens (on) or away from the pupil of the projection lens (off). A multiple-element 15 projection cell magnifies the image coming off the DMD™ at the desired MTF, lateral color, and distortion.

As is known to those of ordinary skill in the art display devices are characterized by inherent non linearities and therefore, providers of such devices typically provide at least one gamma correction table to be used in correcting the nonlinearities. In addition system designers sometimes develop additional gamma tables in accordance with particular characteristics of the devices comprising the system design. The non-linearities include spatial non-uniformity, color non-uniformity, and/or luminance non-uniformity, but may also include other known image artifacts or irregularities.

Figure 2:
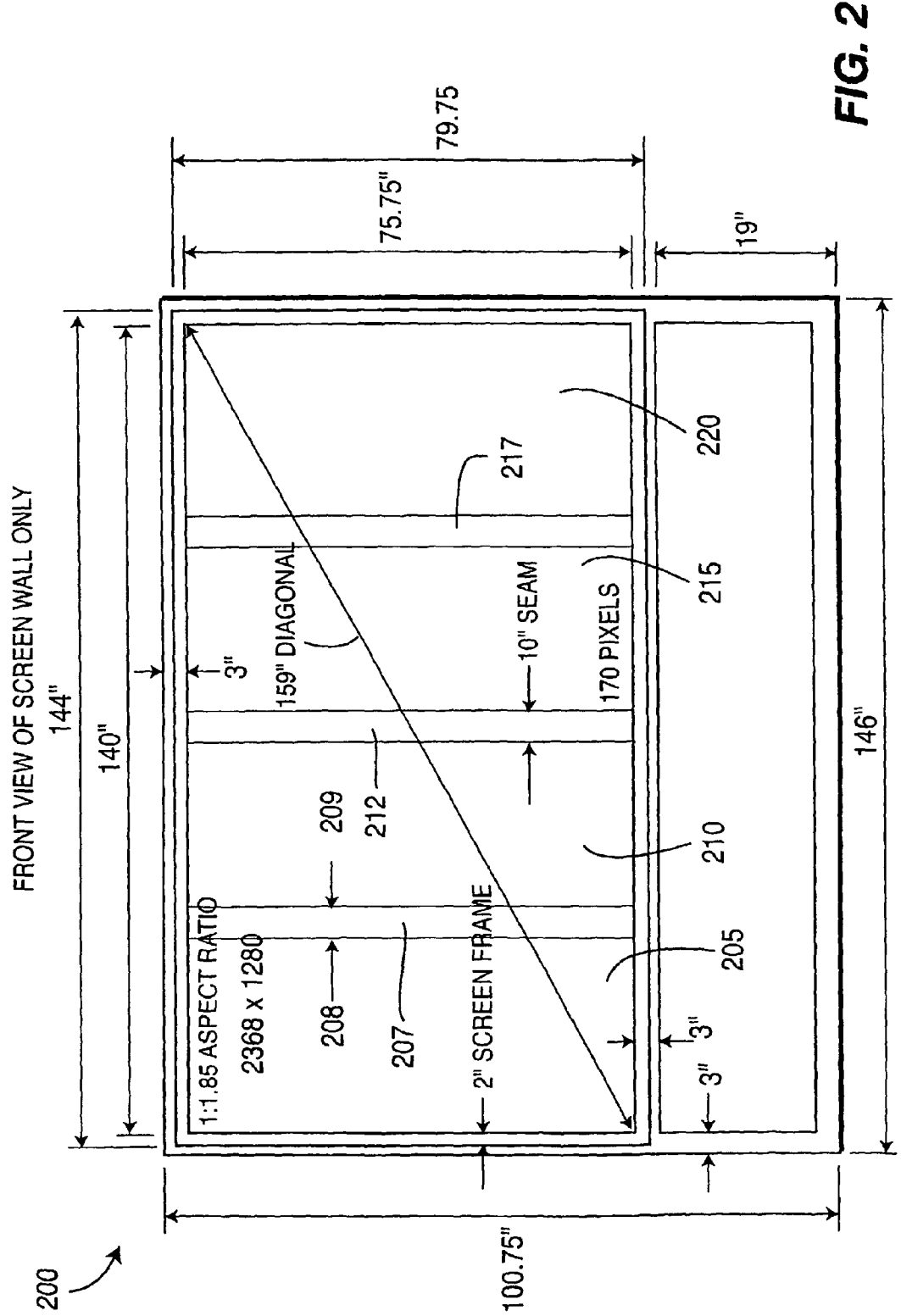
FIG. 2 is a front view illustrating projectors of a display device arranged in accordance with an embodiment of the invention.

FIG. 2 illustrates an embodiment of image displaying surface 230 having a total image display area measuring about 140" in width. In one embodiment of the invention, the image displaying surface is a display screen having a screen gain of unity. In the embodiment shown, the display surface is bordered by a bezel 230 having a width of 2". The display surface and bezel are seated in a frame having a width of 3". It is important to note, the dimensions given herein represent only one example of a wide variety of possible configurations, display dimensions, frame dimensions etc. for display systems.

The invention is suitable for implementation in other configurations too numerous to mention but these will be readily apparent to the skilled artisan upon reading the specifications and description of the invention contained herein.

In the embodiment illustrated, each of a plurality of projectors (for s example projectors 105, 110, 115 and 120, illustrated, for example, in FIG. 1) projects, substantially simultaneously, a corresponding image onto image displaying surface 130. Each projected image defines a corresponding discrete 205, 210, 215 and 220 upon image displaying screen 230. Viewed as a whole, images 205, 210, 215 and 220 substantially fill image displaying surface 230 with a single video image, frame of video, or picture, to be displayed to a viewer. The technique of arranging projectors, image portions and image displaying surfaces to display images in this manner is referred to herein as "tiling". A drawback of tiling techniques is the resulting visible artifacts in the displayed image that occur in the regions of the seams, that is in the region where an image projected by a first projector, overlaps an image projected by a second projector. According to an embodiment of the invention a seaming unit comprising a processor and method are provided to reduce tiling artifacts in the seams of the displayed image.

Figure 3:
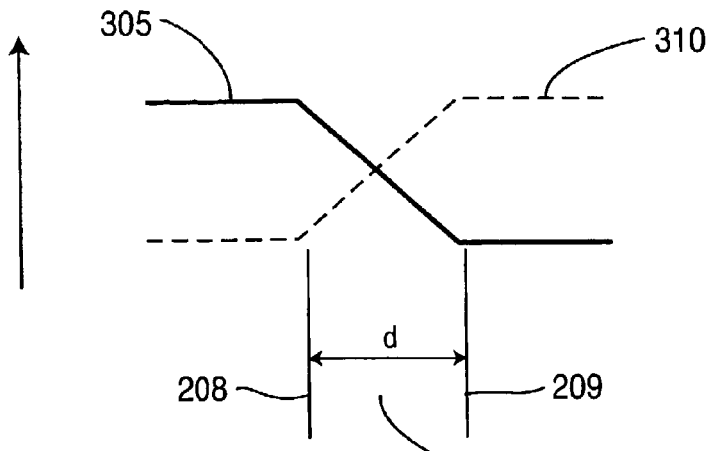
FIG. 3 is a graph illustrating the relationship between projected image brightness for pixels from projected images according to an embodiment of the invention.
Figure 4:
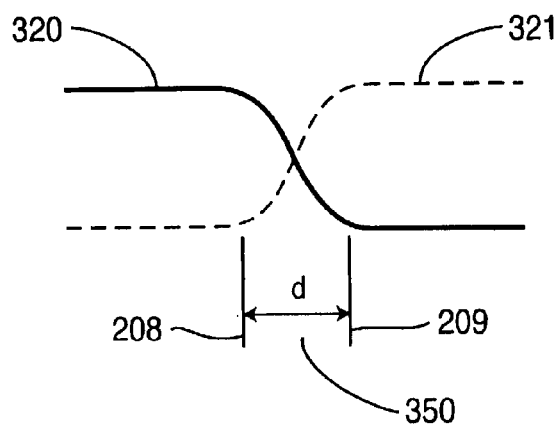
FIG. 4 is a graphic illustration of the relationship between projected image brightness for two projected images in the area inside a seam of a system according to an embodiment of the invention.

Returning now to FIG. 1, processor 170 implements the methods according to various embodiments of the invention. As previously described processor 170 receives video signals representing the desired displayed image from image source 175. According to one embodiment of the invention artifacts due to seams 107, 112 and 117 are corrected in the following manner. For purposes of discussion only projectors 105 and 110 will be discussed. However, the method is the same for the remaining projectors. Processor 170 provides data x1 for projector 105 such that image 106 turns to black at edge 208. At the same time processor 170 provides data x2 for projector 110 such that image 111 turns to black at edge 209. This method is illustrated in more detail in FIG. 3. wherein line 106 represents the brightness of pixels comprising image 106 from edge 208 to edge 209. Likewise, line 111 represents the brightness of pixels of image 111 from edge 208 to edge 209. The pixels of Image 106 are at a level brightness at edge 208, wherein the pixel brightness values begin to decrease until a black value is obtained at edge 209. The pixels of image 111 are black at edge 208 and increase to a level of brightness at edge 209.

Therefore, processor 170 adjusts the brightness of the portion of image 106 displayed in seam 107 and the brightness of the portion of image 111 displayed in seam 107 in an inverse relationship.

According to an embodiment of the method, pixels displayed in a, seam region have a pixel position represented by j. Each displayed pixel j in the seam comprises a first pixel $X_1$ from the corresponding pixel of the image 106 projected by projector 105, and a second pixel $X_2$ from the corresponding pixel of the image 111 projected by projector 110. For projector 110, for example, brightness of successive projected pixels $X_1$ is increased from black at edge 208 to a value Y at edge 209. The value Y corresponds to a uniform brightness for the seam region. At the same time, for the image projected by projector 205, the brightness of successive pixels $X_2$ decreases from Y at edge 208 and reaches black at edge 209. The relationship between pixels $X_1$, $X_2$, j and Y is expressed, according to one embodiment of the invention, as follows:

$$x1 = \left(\left(\frac{j}{\text{overlap}}\right)\right)^{1/gamma} \quad (1)$$

$$x2 = \left(\left(1 - \frac{j}{\text{overlap}}\right)\right)^{1/gamma} \quad (2)$$

Wherein $X_1$ represents a pixel of the image projected by projector 105, $X_2$ represents a pixel of the image projected by projector 110, and j is the pixel number in the seamed area of the displayed pixel comprising $X_1$, $X_2$. Overlap represents seam area in number of pixels, and gamma corresponds to the gamma correction for the projector. As can be seen, there exists an inverse relationship between the brightness of the image projected by projector 205 and the brightness of the image projected by projector 210 in the region defined by the seam.

However, even with this technique, a shadow effect is sometimes observed. This effect is particularly noticeable if a viewer looks at the screen from an oblique angle. Thus there appears a small amount of increased brightness at the seamed area. Compensation for this effect is dependent on screen gain. For purposes of discussing one embodiment of the invention, a screen gain of 1 is assumed. For embodiments of the invention employing lower screen gains, the compensation need not be as high as and is adjusted accordingly.

Furthermore, the shadow effect is more easily observed for projector lens having relatively wide field angles. Conversely, the effect is less noticeable for projector lens having relatively narrow field angles. Nevertheless, the brightness profile in the seam area is not always 100% uniform. Depending on projection lens field angle and screen gain factor, the brightness profile in the seam area varies from linear to Gaussian. For purposes of discussion, the uniformity of each projector according to an embodiment of the invention is assumed to be 80% with ±20° field angle as illustrated in FIG. 5.

According to another embodiment of the method, pixels displayed in a seam region have a pixel position represented by j. Each displayed pixel j in the seam comprises a first pixel $X_1$ from the corresponding pixel of the image 106 projected by projector 105, and a second pixel $X_2$ from the corresponding pixel of the image 111 projected by projector 110. For projector 110, for example, brightness of successive projected pixels $X_1$ is increased from black at edge 208 to a value Y at edge 209. The value Y corresponds to a uniform brightness for the seam region. At the same time, for the image projected by projector 205, the brightness of successive pixels x2 decreases from Y at edge 208 and reaches black at edge 209. The relationship between pixels $X_1$, $X_2$, j and Y is, in this embodiment quadratic and is expressed, according to one embodiment of the invention, as follows:

$$x1 = \left(0.5 \times \text{cosine}\left(\frac{PI \times j}{\text{overlap}}\right) + .5\right)^{\frac{1}{gamma}}$$

$$x2 = \left(1 - \left(0.5 \times \text{cosine}\left(\frac{PI \times j}{\text{overlap}}\right) + .5\right)\right)^{\frac{1}{gamma}}$$

Wherein $x1_1$ represents a pixel from said first image portion after processing, x2 represents a pixel from said second image portion after processing, j represents the pixel number in the seam region corresponding to the location of overlapping pixels x1 and x2, overlap is the seaming area in number of pixels, and gamma is related to the gamma correction of the projector.

To further compensate for distortion due to non linearities, the techniques described above are further adjusted in accordance with the uniformity profile of each projector. According to an alternative embodiment of the invention pixels x1 and x2 are adjusted based upon the uniformity curve of a corresponding projector. An example uniformity curve is illustrated in FIG. 5

In non tiled, i.e., single projector, display systems, gamma correction is commonly employed to correct for distortion in displayed images due to, for example, inherent non linearities in lens, imagers, displays and other imaging and display system components. Gamma correction can substantially reduce the distortion and image artifacts attributable to the properties of the imaging devices and system components themselves. According to one embodiment of the invention, projectors 205, 210, 215 and 220 are of a type that includes such gamma correction capabilities.

According to one embodiment of the invention a method of reducing tiling artifacts in seam regions relies on adjusting the gamma correction of the projectors in a particular way so as to reduce tiling artifacts. In one embodiment, a method for reducing artifacts in seams of tiled images comprises the steps of applying a first gamma correction to image portions within the seams and a second gamma correction to image portions displayed outside the seams.

Non-linearities due to display transfer functions can be corrected by a digital lookup table, referred to as a gamma table. The gamma table corrects for the differences in gain in the transfer function. According to one embodiment of the invention, gamma values from such a gamma table are adjusted so as to achieve a uniform brightness for the combined images, and, in one embodiment of the invention, further adjusted according to the characteristics of each projector comprising the system.

According to one embodiment of the invention, the first and second image portions are adjusted based on the uniformity profile of projectors 105 and 110 respectively. According to one embodiment of the invention, gamma correction is provided based upon differences in brightness characteristics between seam regions and non-seam regions of the projected image.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and II changes which come within the meaning and range of equivalency of the claims are therefore intended to be embraced therein.

The invention claimed is:

1. A display for producing a substantially seamless combined image on a screen from at least first and second images, comprising:

at least first and second projectors for projecting corresponding first and second images separately onto a screen, said projectors projecting said first and second images such that a portion of said first image overlaps a portion of said second image so as to define at least one seam region on said screen;

an image processor coupled to said first and second projectors for adjusting brightness of said first and second image portions such that said seam is substantially not visible to a viewer; wherein said processor adjusts said brightness of said first and second image portions according to a quadratic relationship, wherein said quadratic relationship is described by the relationship:

$$x1 = \left(0.5 \times \text{cosine}\left(\frac{PI \times j}{\text{overlap}}\right) + .5\right)^{\frac{1}{gamma}} \text{ and}$$

$$x2 = \left(1 - \left(0.5 \times \text{cosine}\left(\frac{PI \times j}{\text{overlap}}\right) + .5\right)\right)^{\frac{1}{gamma}}$$

wherein x1 represents a pixel from said first image portion after processing, x2 represents a pixel from said second image portion after processing, j represents the pixel number in the seam region corresponding to the location of overlapping pixels x1 and x2, overlap is the seaming area in number of pixels, and gamma is related to the gamma correction of the projector.

2. A method for producing a substantially seamless combined image on a screen from at least first and second images, comprising:

providing at least first and second projectors for projecting corresponding first and second images separately onto a screen, said projectors projecting said first and second images such that at least a portion of said first image overlaps at least a portion of said second image so as to define at least one seam region on said screen;

processing said first and second image portions so as to adjust at least one characteristic of said first and second image portions in accordance with corresponding characteristics of said projectors;

projecting said adjusted first and second image portions onto said screen;

adjusting the brightness of said first and second image portions in accordance with the linearly inverse relationships:

$$x1 = \left(\left(\frac{j}{\text{overlap}}\right)\right)^{1/gamma} \text{ and}$$

$$x2 = \left(\left(1 - \frac{j}{\text{overlap}}\right)\right)^{1/gamma}$$

wherein x1 represents a pixel from said first image portion after processing, x2 represents a pixel from said second image portion after processing, j represents the pixel number in the seam region corresponding to the location of overlapping pixels x1 and x2, overlap is the seaming area in number of pixels, and gamma is related to the gamma correction of the projector.

3. The method of claim 2 wherein said characteristics of said projectors are selected from the group comprising projector lens characteristics, image transfer function characteristics, display transfer function characteristics, imager gamma, display gamma.

4. The method of claim 2 wherein said adjustment is determined without relying on information provided by any screen image capture means.

5. The method of claim 2 further including a step of gamma correcting said displayed image by applying a first gamma correction to portions of said images within said seam region and a second gamma correction, different from said first gamma correction, to remaining portions of said displayed image.

6. The method of claim 2 including wherein said processing step is carried out such that said combined image is of substantially uniform brightness when displayed on said screen.

* * * * *